United States Patent
Padmanabhuni et al.

(10) Patent No.: US 8,122,365 B2
(45) Date of Patent: Feb. 21, 2012

(54) SYSTEM AND METHOD FOR DYNAMIC CREATION AND CUSTOMIZATION OF A USER INTERFACE IN A WEB SERVICE ENVIRONMENT

(75) Inventors: Srinivas Padmanabhuni, Bangalore (IN); Krishnendu Kunti, West Bengal (IN); Anshuk Chinmoy Pal Chaudhuri, West Bengal (IN); Shaurabh Bharti, Bihar (IN)

(73) Assignee: Infosys Technologies, Ltd., Bangalore (IN)

( * ) Notice: Subject to any disclaimer, the term of this patent is extended or adjusted under 35 U.S.C. 154(b) by 539 days.

(21) Appl. No.: 11/709,889

(22) Filed: Feb. 23, 2007

(65) Prior Publication Data

US 2007/0209011 A1 Sep. 6, 2007

(30) Foreign Application Priority Data

Feb. 23, 2006 (IN) .............................. 296/CHE/2006

(51) Int. Cl.
G06F 3/00 (2006.01)
G06F 15/16 (2006.01)

(52) U.S. Cl. ........ 715/760; 715/762; 715/765; 709/217; 709/227

(58) Field of Classification Search .......... 715/760–765, 715/781, 788, 840, 854; 709/217, 227, 229
See application file for complete search history.

(56) References Cited

U.S. PATENT DOCUMENTS

| | | | |
|---|---|---|---|
| 6,272,493 B1 * | 8/2001 | Pasquali | 707/10 |
| 6,591,266 B1 * | 7/2003 | Li et al. | 707/10 |
| 7,475,354 B2 * | 1/2009 | Guido et al. | 715/742 |
| 7,493,329 B2 * | 2/2009 | McMullen et al. | 707/100 |
| 7,725,530 B2 * | 5/2010 | Sah et al. | 709/203 |
| 7,739,310 B1 * | 6/2010 | Shmulevich et al. | 707/802 |
| 2002/0111814 A1 * | 8/2002 | Barnett et al. | 705/1 |
| 2002/0138572 A1 * | 9/2002 | Delany et al. | 709/204 |
| 2002/0169852 A1 * | 11/2002 | Schaeck | 709/218 |
| 2003/0023953 A1 * | 1/2003 | Lucassen et al. | 717/106 |
| 2003/0090516 A1 * | 5/2003 | Stein | 345/745 |
| 2003/0145067 A1 * | 7/2003 | Cover et al. | 709/220 |
| 2003/0188163 A1 * | 10/2003 | Fischer et al. | 713/170 |
| 2004/0030740 A1 * | 2/2004 | Stelting | 709/201 |
| 2004/0068554 A1 * | 4/2004 | Bales et al. | 709/218 |
| 2004/0133660 A1 * | 7/2004 | Junghuber et al. | 709/219 |
| 2004/0143795 A1 * | 7/2004 | Matsuishi | 715/530 |
| 2005/0015491 A1 * | 1/2005 | Koeppel | 709/226 |
| 2005/0149410 A1 * | 7/2005 | Livesay | 705/26 |
| 2006/0010390 A1 * | 1/2006 | Guido et al. | 715/742 |
| 2006/0015846 A1 * | 1/2006 | Fraleigh et al. | 717/109 |
| 2006/0026557 A1 * | 2/2006 | Petri | 717/106 |
| 2006/0041499 A1 * | 2/2006 | Nagarajayya | 705/37 |
| 2006/0080612 A1 * | 4/2006 | Hayes et al. | 715/742 |
| 2006/0136588 A1 * | 6/2006 | Allamaraju et al. | 709/224 |
| 2006/0167860 A1 * | 7/2006 | Eliashberg et al. | 707/3 |
| 2006/0212836 A1 * | 9/2006 | Khushraj et al. | 715/866 |
| 2006/0225094 A1 * | 10/2006 | Facemire et al. | 725/45 |
| 2007/0006083 A1 * | 1/2007 | Daniels et al. | 715/742 |
| 2007/0043766 A1 * | 2/2007 | Nicholas et al. | 707/104.1 |
| 2007/0067712 A1 * | 3/2007 | Baker et al. | 715/506 |
| 2007/0124506 A1 * | 5/2007 | Brown et al. | 709/252 |
| 2007/0169015 A1 * | 7/2007 | Seelig et al. | 717/136 |
| 2007/0180097 A1 * | 8/2007 | Roth | 709/223 |
| 2008/0126476 A1 * | 5/2008 | Nicholas et al. | 709/203 |
| 2009/0006971 A1 * | 1/2009 | Guido et al. | 715/733 |

* cited by examiner

Primary Examiner — Tadeese Hailu
(74) Attorney, Agent, or Firm — LeClairRyan, a Professional Corporation

(57) ABSTRACT

A method, system, and computer program product for dynamic creation and customization of a user interface in a web service environment, including dynamically generating and customizing a portlet; providing policy based access to the portlet depending on a consumer of the portlet; providing caching or cache refreshing of a feed to the portlet; and providing authentication of a consumer of the portlet.

27 Claims, 6 Drawing Sheets

SYSTEM AND METHOD FOR DYNAMIC CREATION AND CUSTOMIZATION OF A USER INTERFACE IN A WEB SERVICE ENVIRONMENT

CROSS REFERENCE TO RELATED DOCUMENTS

This application claims priority under 35 U.S.C. §119 to Indian Patent Application Serial No. 296/CHE/2006 of PADMANABHUNI et al., entitled "SYSTEM AND METHOD FOR DYNAMIC CREATION AND CUSTOMIZATION OF USER INTERFACE IN A WEB SERVICE ENVIRONMENT," filed Feb. 23, 2006, the entire disclosure of which is hereby incorporated by reference herein.

BACKGROUND OF THE INVENTION

Field of the Invention

The present invention generally relates to the field of web services, and more particularly to a system and method for dynamic creation and customization of a user interface in a web service environment.

DISCUSSION OF THE BACKGROUND

Interoperability in software systems is emerging as a key concern in today's integration scenarios. There are two interoperability imperatives in context of enterprise integration today, including:

Universal and standards based means of invocation of applications via standards based interfaces.

Standards based representation of data and APIs in a universal format, understood by maximum number of consuming applications with minimum semantic issues.

The latter has found implementation in the form of domain specific XML constructs, such as ACORD for the insurance industry or XML feeds, such as RSS (Really Simple Syndication), that can be consumed by consuming applications. RSS is emerging as a key semantic standard for syndication of web site content.

While the former has found its implementation in the form of standards that define interfaces and messaging formats in platform independent manner, e.g., Web services standards, Web services standards have been used in a number of practical ways to address specific business scenarios warranting flexibility, cost-effectiveness and consumer base expansion. Domain specific XML syntax and Web services have been combined in a number of scenarios (e.g., ACORD Web services), where service providers and consumers communicate with one another in the form of predefined XML constructs, as part of the shared vocabularies.

While predominant applications leveraging the interoperability offered by Web services fall either in the data tier, or application integration tier, a recent trend has been the leveraging of Web services at presentation tier, for creation of universal interoperable remote portlets. Web Services for Remote Portlets (WSRP) is a standard that allows aggregator applications to consume remote portlets based on Web services interfaces. WSRP is built over core Web services standards and provides for provisioning and consumption of remote portlets, as Web services end points. WSRP enables sharing of a remote UI (user interface) in a platform independent and standards based manner.

In practice, there are business instances where in the presentation tier a number of service consumers need custom UI representations of common data that might be provided in form of XML feeds, such as RSS. In such scenarios, syndication of dynamically generated UI is the most desired option. Until now, in such instances, individual aggregator applications consumed these data feeds and rendered them in the required UI format. This approach leads to considerable replication of effort for multiple consumers. Additionally, instead of using dynamic feeds, individual aggregators maintain their own version of local data that gets updated at regular intervals, resulting in outdated information. This might be due to a number of reasons, such as the overhead of conversion of source data to local database format, update frequency, etc.

Therefore, there is a need for a method and system to provide an end-to-end architectural approach that combines usage of WSRP along with XML syndication feeds, such as RSS, and the like, for creation of a standards based, dynamically generated, reusable UI that can be consumed by aggregators, such as Portals, and the like.

SUMMARY OF THE INVENTION

The above and other needs are addressed by the present invention which provides a method, system, and software with exemplary embodiments for envisaging a real life business scenario, for example, where XML content from a single provider can be converted into a custom UI (user interface) representation for every individual consumer, and which define an exemplary architecture to address such issues. In addition, the exemplary embodiments address redundancy of maintaining multiple sets of data, dynamic generation, reuse and customization of the UI, including UI syndication started with the advent of portlets and portal technology. The present invention includes recognition that previously there was no concept of reuse of portlets. In order to address this issue, JSR 168 was proposed by the Java community. For example, any JSR 168 portlet can be reused by redeploying it in any JSR 168 portal. However, using JSR 168, portlets still required physical installation in a JSR 168 portal, as JSR 186 in it of itself does not allow usage of remote portlets.

The WSRP standard allows remote portlets to be exposed as services, which can be consumed by a WSRP compliant portal, thereby alleviating the requirement of physical installation, as in case of a JSR 168 portlet. There are a number of open source and proprietary portal servers that support WSRP. Jakarta Jetspeed2, GridSphere, and the like, are a few open source implementations, while WebSphere Portal 4.1, BEA Weblogic portal, Sun One portal server, and the like, are offerings from vendors. WSRP has made it possible to realize the promise of interoperable UI syndication, but using WSRP alone does not enable dynamic generation/customization of content from standard data formats, such as XML. Technologies, such as XForms, and the like, provide means for flexible generation of a UI from data representation in XML. These two technology features, i.e., flexible generation of a UI from raw data, and syndication of a UI, can act as a potent combination to address a variety of real life business scenarios. The exemplary embodiments include one such exemplary technology combination with several real world possible usage scenarios, including combining RSS along with WSRP for syndication of a dynamically generated UI, and the like. In addition, a number of exemplary approaches are described for the generation of content from XML, including the novel feature of directly generating server pages from an XML feed, and the like.

Accordingly, in an exemplary aspects there is provided a method, system, and computer program product for dynamic creation and customization of a user interface in a web service environment, including dynamically generating and customizing a portlet; providing policy based access to the portlet depending on a consumer of the portlet; providing caching or cache refreshing of a feed to the portlet; and providing authentication of a consumer of the portlet.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various respects, all without departing from the spirit and scope of the present invention. Accordingly, the drawings and descriptions are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENTS

Figure 1:
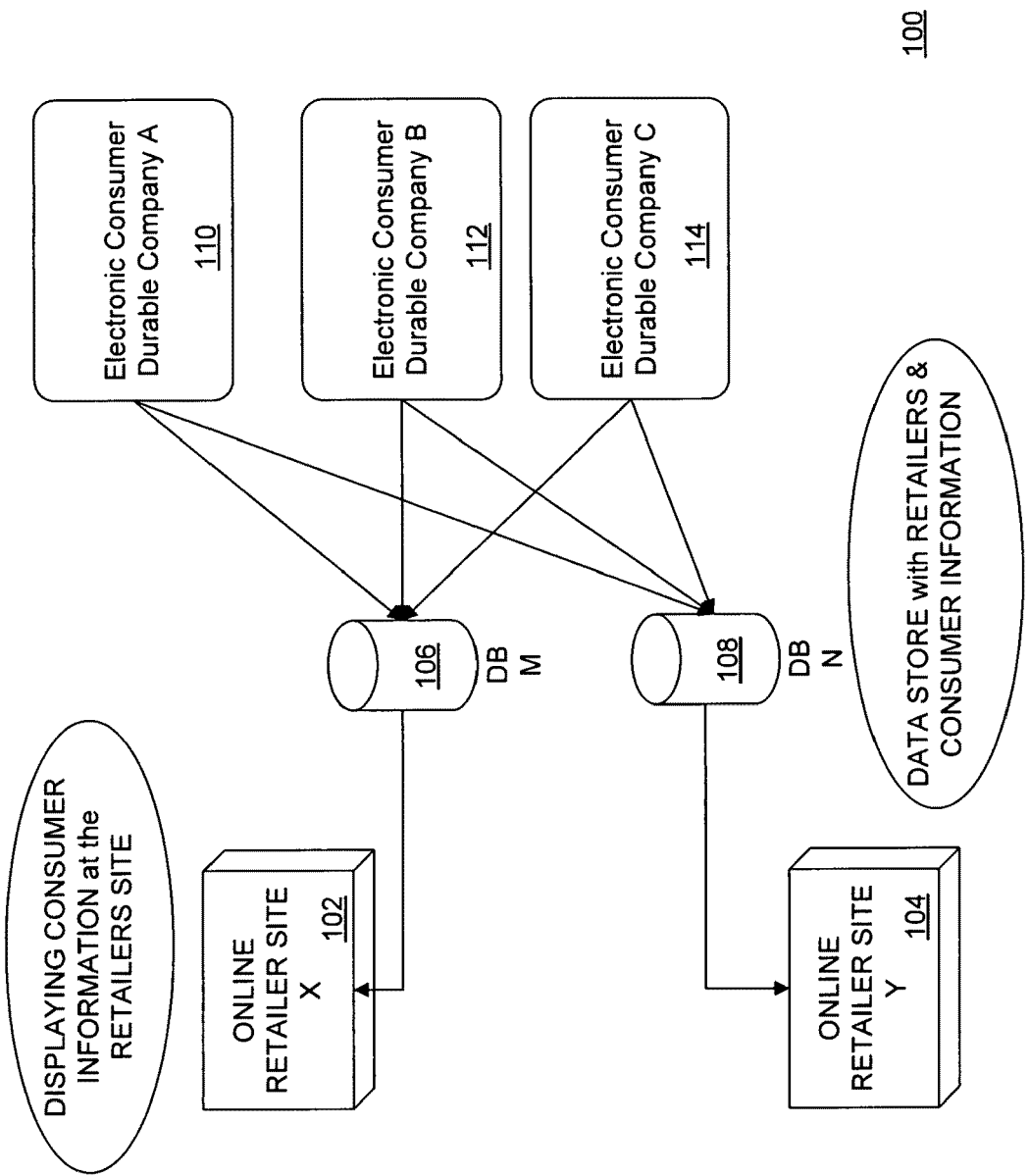
FIG. 1 illustrates an exemplary manufacturer-retailer architecture, according to an exemplary embodiment.

Referring now to the drawings, wherein like reference numerals designate identical or corresponding parts throughout the several views, and more particularly to FIGS. 1-6 thereof, which will be used to illustrate a method, system, and software for dynamic creation and customization of a user interface in a web service environment, accordingly to exemplary embodiments.

In one exemplary embodiment, a system is provided using predefined XML feeds, such as RSS, and the like, and with WSRP for dynamic creation and customization of a UI (user interface). As will be appreciated by a person skilled in the art, by way of an example, a real life business scenario is described where XML content from a single provider needs to be converted into a custom UI representation for every individual consumer, and is defined by an exemplary architecture to address such issues. Advantageously, the exemplary embodiments address redundancy of maintaining multiple sets of data, dynamic generation, reuse, and customization of a UI, and the like.

The following example illustrates a problem related to product data display from multiple manufacturers in a retailer web site (e.g., in the Consumer Electronics industry, and the like).

Present Market Scenario

In today's consumer driven economy, every enterprise aims at fulfilling the needs of end-user consumers as soon as possible. This makes it important for producers to ensure that information about their products reaches consumers as fast as possible.

On average, more than 50% of consumers browse the internet for products information, before going to store. Importantly, websites of companies and retailers figure as the top three product information sources. This necessitates that web sites of both manufacturers and retailers remain updated with the most recent and relevant information. Retailers also include third parties, such as online stores (e.g., BestBuy, BuyDig, etc.), who play a vital role in today's market. Consumers prefer going to these retailers for various reasons, including a variety in price offerings and brands. Most often, these retailers sell products from more than one company and keeping their web site updated from multiple sources presents a daunting task. In the exemplary scenario, typically, individual web site 102-104 owners are responsible for maintaining product catalogs 106-108 of companies 110-114 locally and with the UI generated according to their specific needs, as shown in the exemplary system 100 of FIG. 1.

Portals are regarded as a one point access to all web applications needed for the end-user. Today, most retailers are offering e-Commerce portals to consumers for using their services. These portals are an aggregation of different portlets. Each portlet can include an application implementing a service. Portlets can be locally created on a system and then used. Portlets can also reside on remote systems (e.g., remote portlets), and which can be invoked, for example, using WSRP. A commercial public portal (e.g., accessible to all without any authentication) is in generally horizontal in nature. For example, each portlet corresponds to group of similar services. To consume a service, a consumer browses through the portlets and picks the services suitable to his or her needs.

As the market is growing, consumers are becoming more specific about their needs. For example, a student may be more interested in e-learning services than shopping for cooking utensils. In other words, consumers are more interested in personalization of portals. Consumer preferences, content, consumer devices (e.g., PDA, Laptop, etc.) and other factors affect the portlet content in portals. Moreover, as these factors change with time, portals need regular maintenance as well. This demands a preference based, custom generation of portals for individual consumers. However, it would not be possible to generate and maintain these portals for each of the consumers manually. One exemplary solution is to group consumers under a category comprised of similar interests. However, a more generic solution is needed to create reusable and flexible portals, as the complexity is bound to rise over time.

Problem Statement e-Commerce portals offer services from multiple vendors to consumers. In order to address versatile needs of most consumer requirements, retailers need to update information about different products on their website at regular intervals. Moreover, subscribed services (e.g., which are included in portlets from vendors) and consumed content keep changing with time, demanding real-time updating of portals, according to preferences and content. Manual re-organization of the portal frameworks is not feasible. Even though portal generation may entail some mouse clicks to include constituent portlets, it could be a significant problem in the case of portals that actually consist of many lower level portals (e.g., due to their horizontal nature). This becomes even more challenging in case of consuming services from multiple vendors. As contracts and business context keep changing, it would be tough to manage and incorporate changes in all portals. If a portlet is no longer offered by a provider, it would be hard to eliminate it from all the portals where it was used. Hence, seeing the fast-changing market conditions and consumer tastes, there is clear need of an automated technique for dynamic portal-generation and maintenance in e-Commerce.

Secondly, the need to address the problem of personalized-portals for individual consumers is high. For example, a lot of time and money would be consumed to satisfy consumer requirements that keep changing, if done manually. Hence, an automated generation for consumer portals would not only be cost and time effective, but will also allow providers to address the needs of an expanded consumer base, and the like.

Exemplary Logical Solution

Figure 2:
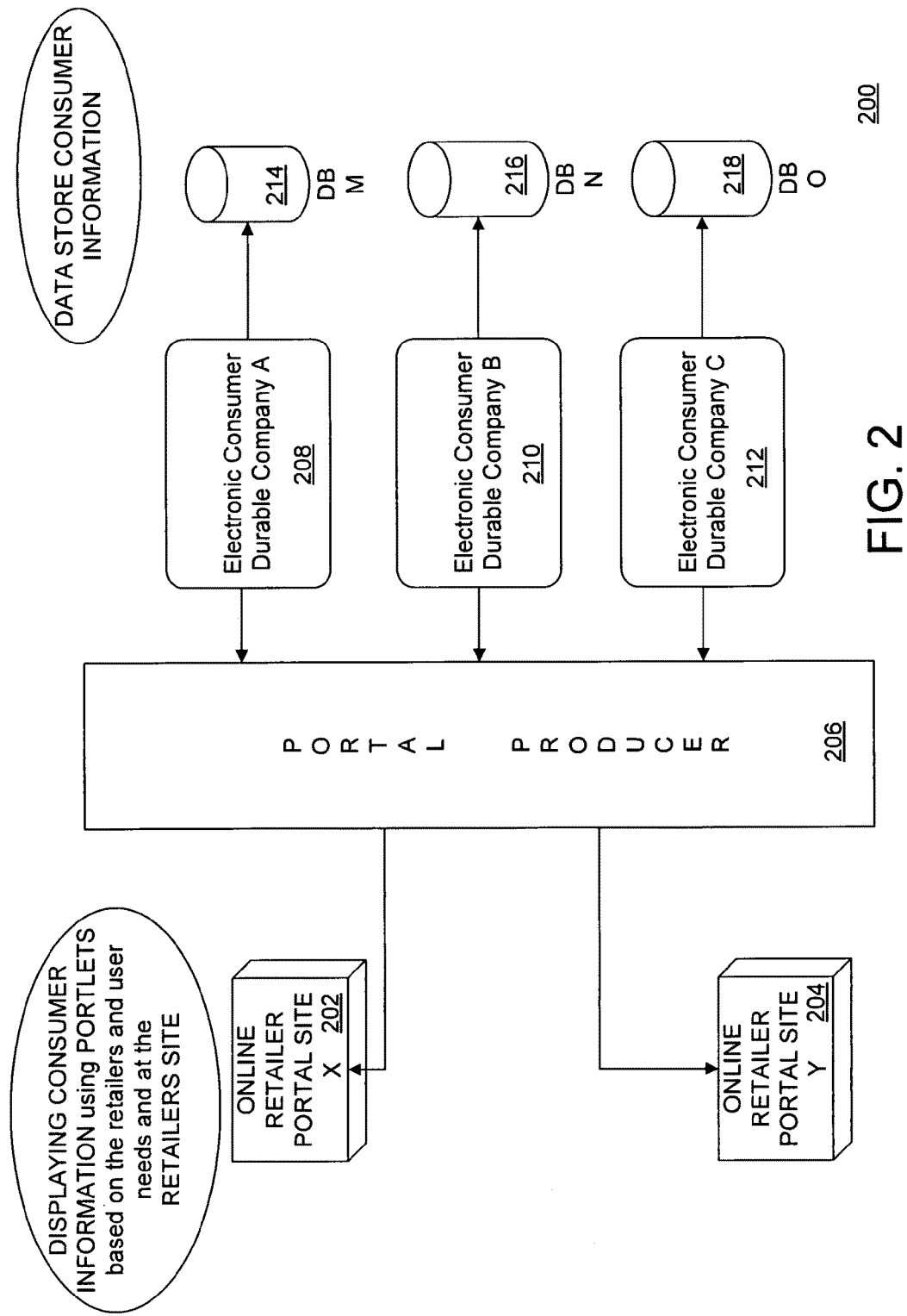
FIG. 2 illustrates another exemplary manufacturer-retailer architecture, according to an exemplary embodiment.

FIG. 2 illustrates an exemplary logical architecture 200 to support the above stated business scenario. As shown in FIG. 2, a third party remote portal producer 206 is responsible for the generation of portals 202-204, for example, using a xml data feed from individual manufacturers 208-212 having databases 214-218. e-Commerce portals can in turn consume such portals.

As stated earlier, the exemplary embodiments address the aforementioned and other problems by automating portal generation and maintenance of e-Commerce portals. For example, the exemplary embodiments can include a common WSRP compliant remote portlet producer that uses a domain specific XML data feed for dynamic generation of markup for creation of remote portlets. The XML feed includes information regarding services, such location, and the like. The XML feed is fed to the Portal Producer 206, as shown in FIG. 2, which creates or updates the portal for consumers on the retailer sites 202-204.

The first aforementioned problem had e-Commerce portals having to include huge amounts of content to be displayed and used by many portlet services. The configuration of a portal is primarily identified by its portlets and their attributes, such as position, location, and the like. The portal also differentiates between different kinds of users. Hence, the portal offers different functionalities for administrators, subscribed users, visitors, and the like. Settings and configuration information can be stored in a configuration file, for example, that is based on a XML format, and the like. Advantageously, modifications of the portal are done by modifying configuration files. This offers several advantages, including providing a hierarchical picture of the site, and simplifying various kinds of updates, such as adding and removing portlets, consumers, and the like. By feeding the updated configuration file to the Portal Producer 206, updated or new portal pages are created (e.g., according to the needed changes).

The second problem concerns personalized portals for consumers. Advantageously, the exemplary portlets can be generated according to the specific customer requirements, such as the look and feel, selective data representation (e.g., a online dealer might not be dealing with a particular line of item, such as a camcorder or a specific manufacturer), policy based access for every consumer, and the like. For example, retailers can create a separate configuration file for each consumer. Each file can include various types of information regarding the consumers, as well as the portal. The configuration file can include the services the consumer would like to subscribe to or use. In addition, the configuration file can be configured to automatically search and display new similar services to the consumer's portal, so that the consumer can select and subscribe to the services. If a consumer needs changes, they can request the changes from the retailer. Accordingly, the retailer can update the configuration file, and publish the updated portal.

In addition, such automated generation of portals has many dimensions. For example, various templates for different kinds of portals can be used as a seed for configuration. By providing performance metrics of services in XML Feeds, searching, locating, and subscribing to services can be automated. An automated filtering of services due to performance criteria can be used for automated filling of portlets in portals.

Implementation Details and Realization

In the exemplary embodiments, a combination of RSS and WSRP, advantageously, provides an implementation of the logical architecture, addressing the aforementioned business case. RSS is a format for syndicating news and various news sites information, as well personal weblogs, and the like. The RSS format is not only limited to news sites. In further exemplary embodiments, virtually anything can be logically shelved into different items and can be easily syndicated via RSS. In this context, various custom RSS aggregators are used to read the RSS Data Items and display them to the end user. Advantageously, Web Service Remote Portlets (WSRP) can be used as a standard way to dynamically generate the reusable User Interfaces (UIs) as Portlets and so they can be consumed by the portals.

In this context, an implementation of how exactly WSRP works with RSS (e.g., version 0.91) is further described. Although RSS 2.0 is released, RSS Version 0.91 is employed for its versatility. RSS Version 0.91 is still quite popular and is extensively used in many news sites for basic syndication. However, it should be noted that any other versions of RSS, and the like, can also be used in further exemplary embodiments.

Details of the RSS Syndication

Most often individual web publishers who want others to have a look at their publication create files in RSS format and share them as feeds. These feeds are used by RSS aware news aggregator applications. These applications automatically check RSS feeds and display new items.

How does RSS Look Like?

The RSS feed appearance depends on which version of RSS is being used. Currently, RSS version 2.0 is the de-facto version standard of RSS. RSS 2.0 is extensible via modules and also follows an easy migration path from the 0.9x branch. RSS 2.0 is used for general purpose and metadata-rich syndication.

RSS version 0.91 is used for creation of prototypes, because of its simplicity and wide level of adoption. An exemplary RSS File (e.g., version 0.91) is shown in Listing 1.

Listing 1: Sample RSS File of a Leading a News Site

```
<rss version="0.91">
<channel>
   <title>The Times Of India - India</title>
   <link>http://timesofindia.indiatimes.com</link>
   <description>News from India by India number one
   website</description>
   <language>en-gb</language>
   <lastBuildDate>Mon, 09 Jan 2006 11:05:47+0530</lastBuildDate>
   <copyright>Copyright: Times Internet Limited,
http://info.indiatimes.com/terms/tou.html</copyright>
   <docs>http://syndication.indiatimes.com/</docs>
<image>
  <title>The Times of India</title>
<url>http://timesofindia.indiatimes.com/images/toilogo.gif</url>
<link>http://timesofindia.indiatimes.com/</link>
   </image>
   <title>Phone tapping issue: Amar Singh moves SC</title>
  <description>Samajwadi Party leader Amar Singh on Monday moved
the Supreme Court seeking a judical probe into the telephone tapping
```

-continued

Listing 1: Sample RSS File of a Leading a News Site issue.</description>
<link>http://timesofindia.indiatimes.com/articleshow/1364102.cms</link>
</item>
<channel>
</rss>

In Listing 1, the item element in the RSS File mainly includes Title, Description, and Link. The core of the RSS File is the "item" tag. The item tag represents an individual block of information. For example, for a news channel, the item tag can be used to represent a news topic, for a consumer electronics product catalogue, the item tag can be used to represent individual products, and the like. The description tag includes textual information corresponding to a title of the RSS File. The link tag includes an http link to the actual information page, wherein the referenced page usually includes a more detailed description of the topic.

RSS feeds act as sources of data whose schema is understood by the portlet producer 206 (e.g., a portlet generation application). A remote portlet or web page can be created from a single RSS feed or by combining a number of RSS feeds from multiple sources.

In many instances, the description tag includes the complete HTML markup required to display page to the end user. This approach is a very crude way of capturing static UI information in an RSS feed. The UI created in this manner typically cannot be customized according to specific user needs. The exemplary architecture, however, advantageously, enables dynamic generation of a UI from RSS feeds.

Exemplary Implementation Strategy Architecture

Figure 3:
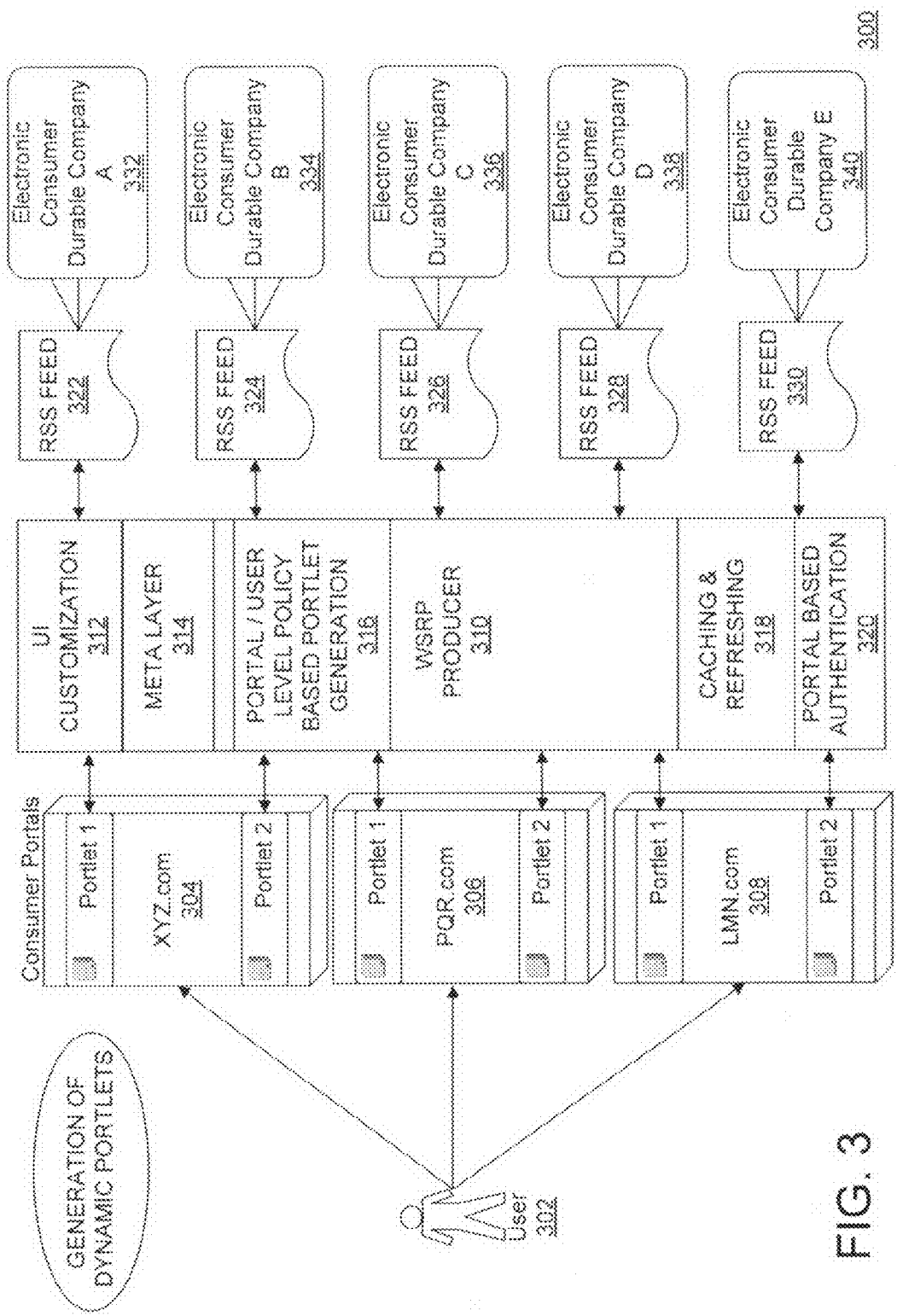
FIG. 3 illustrates an exemplary implementation strategy architecture, according to an exemplary embodiment.

The exemplary objectives of the implementation strategy for the exemplary architecture 300, as shown in FIG. 3, can include:

Dynamic generation and customization of portlets.
Policy based access to portlets depending on the consumer (e.g., Portals as well as Individuals accessing the portal).
Caching and cache refresh strategy of the various XML Syndication Feeds.
Authentication at the portal Level for Different users.

In FIG. 3, the WSRP Producer 310 is responsible for dynamic generation of markup from XML and customization of the UI 312 depending on the consumer 302. The WSRP Producer 310 exposes remote portlets 304-308 as Web service end points. The following functionalities can be implemented at the producer 310, as follows.

Meta layer 314: The Meta layer 314 is the crux of the exemplary architecture, and responsible for generation of markup from XML and including pre-built intelligence for generation of the UI 312 depending on the consumer 302. This layer can support tools, such as XSLT transformation, style sheets, and the like, in order to facilitate the UI 312 generation.

Policy 316 based access to portlets for different users: Consumer 302 might be selectively allowed to access the portals 304-308. This can be implemented using any suitable policy standard, such as WS-policy/XACML or custom code, and the like, that interfaces with back the end system for entitlements information.

Caching and refresh mechanism 318: Portlets 304-308 need not be directly generated from the XML feeds 322-330 coupled to the companies 332-340, but rather can be generated from a cached in-memory object model for XML feeds 322-330. The cache 318 can be refreshed at regular intervals.

Authentication 320: Can be implemented using JAAS and transmitted via WS security or SAML, and the like. In addition, transport level security can be implemented using SSL at the web server level, and the like.

The WSRP producer 310 in this architecture acts as an engine which takes care of the above functionalities. The architecture assumes that data is provided to the producer 310 in some standard form of XML Syndication Feed understood by the producer 310. In the exemplary embodiments, RSS 0.91, and the like, can be employed.

Proof-of-Concept

Figure 4:
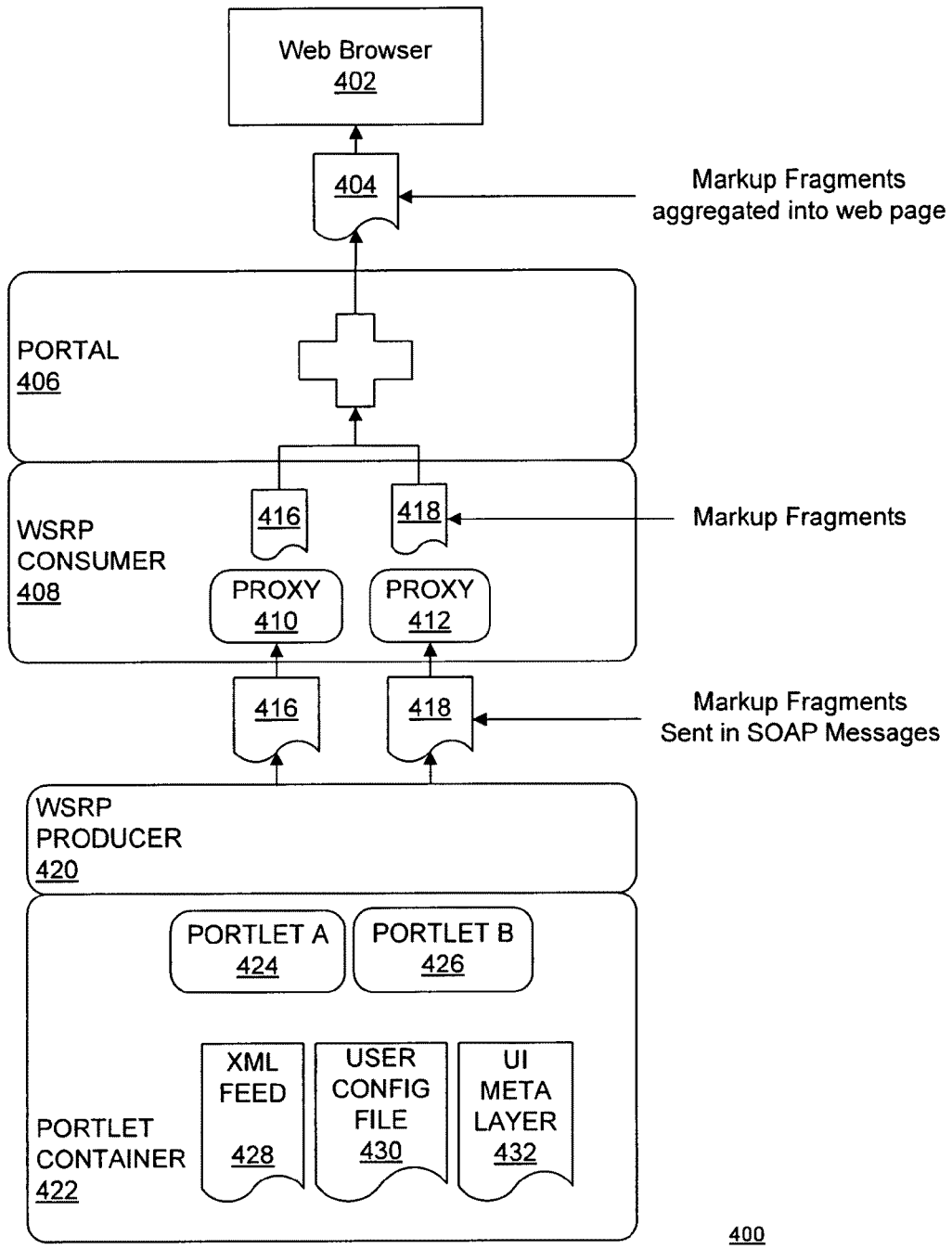
FIG. 4 illustrates an exemplary architecture diagram, according to an exemplary embodiment.

FIG. 4 shows an exemplary architecture 400 of the proof-of-concept (POC) using the implementation strategy described with respect to in FIG. 3. The exemplary components of the implementation design for the POC can include a WSRP Producer, a Consumer Portal, an entitlements database or user configuration file, and the like.

WSRP defines a set of common interfaces that the WSRP Producers 420 employs and which WSRP Consumer Portals use to relate with remotely-running portlets. Standardizing these interfaces allows a consumer portal to interact with remotely-running portlets, since it has a well-defined system for communicating with any WSRP-compliant producer 420. The WSRP Producer 420 or the "containers of Portlets" 422 implements a set of Web Service Interfaces for the complete usage of Consumer Portals.

The WSRP Consumer 408 is an intermediary system, which communicates with the WSRP producer 420 on behalf of its users. The WSRP Consumer 408 aggregates the markups 416-418 from the portlets 424-426 and presents the aggregated page 404 to a web browser 402 of the user. The simplest example of a WSRP Consumer 408 is a Portal 406.

An exemplary configuration file 430 is used to implement policy based access and dynamic generation of a portlet depending on user credentials. Although RSS feeds for a news channel, as an XML data source, can be employed to showcase the exemplary embodiments, feeds for other industries, such as the consumer electronics industry, and the like, can also be employed in further embodiments. Advantageously, the exemplary embodiments allow for XML feeds, and the like, to be used for provisioning of data across a wide variety of industries, and the like.

Figure 5:
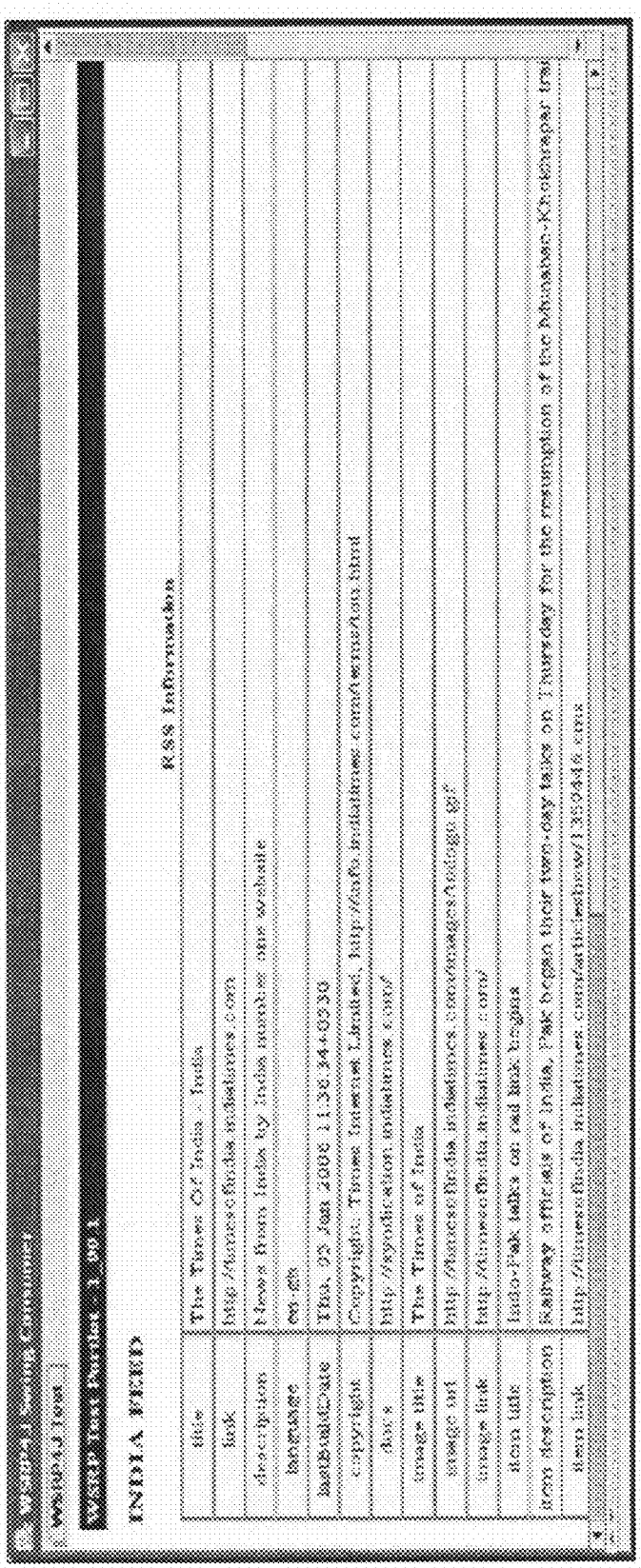
FIG. 5 illustrates an exemplary look and feel for a user interface, according to an exemplary embodiment.
Figure 6:
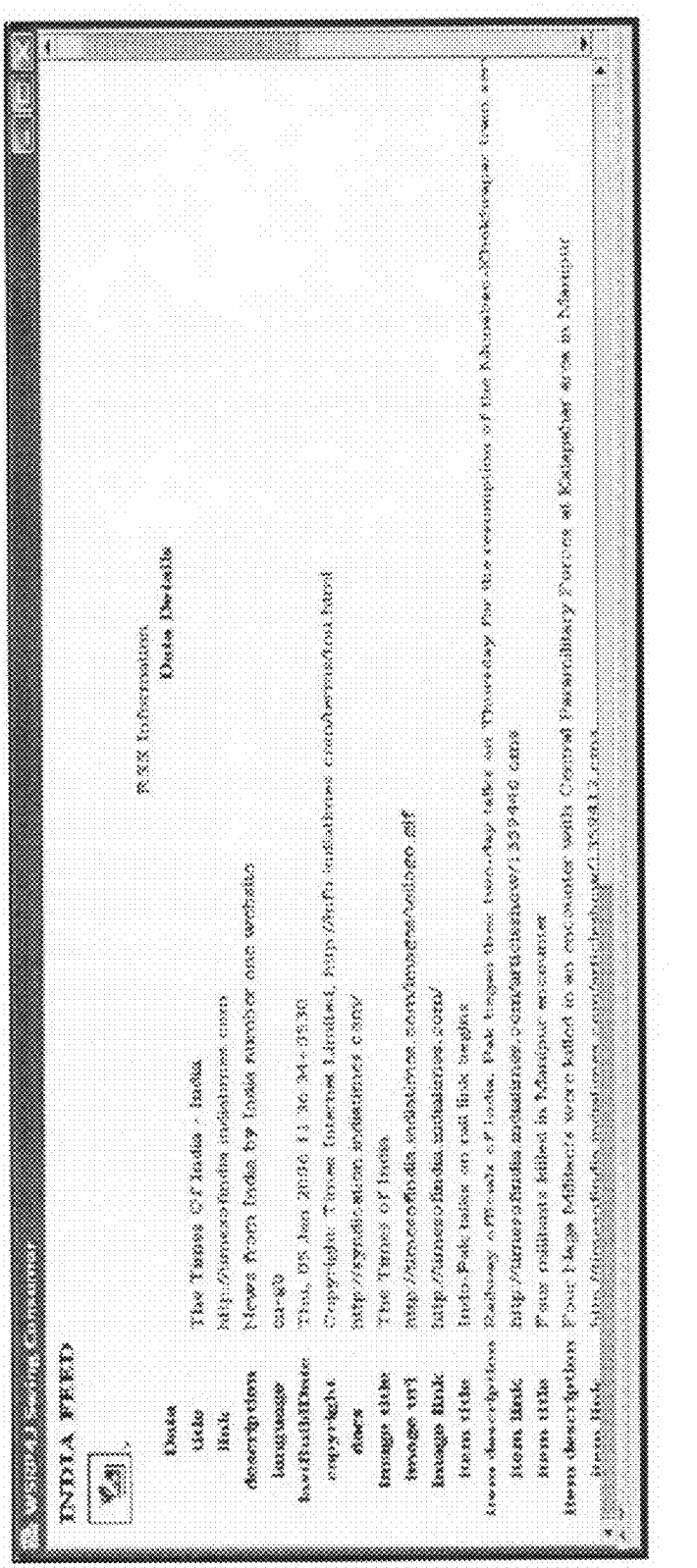
FIG. 6 illustrates another exemplary look and feel for a user interface, according to an exemplary embodiment.

The WSRP Producer 420 and a Portlet Description provide a way by which the Consumer 408 can get the Producer 420 and the Portlets 424-426 it hosts. This involves the use of the operation "getServiceDescription." The basic method for the generation of the markup is "getMarkup," and the markup is aggregated into a page 404 for the end user. FIG. 5 and FIG. 6 show exemplary WSRP UIs 500 and 600, respectively, generated from an XML Syndication Feed 428 displayed in a WSRP portal consumer.

Referring back to FIG. 4, the WSRP producer 420 is implemented using a WSRP portlet container 422. User configuration files 430 are used to capture policy base access, authentication and user specific UI customization, and the like. The UI Meta later 432 is used for rendering the markup 428 based on user specific markup generation information captured in the configuration files 430. The WSRP consumer 408 is implemented using a WSRP compliant portal 406. Listing 2 below shows an exemplary SOAP request 416-418 to access a remote portlet and a Markup SOAP REQUEST.

Listing 2: SOAP request to access a remote portlet and a Markup SOAP REQUEST

```
<soapenv:Envelope xmlns:soapenv="http://schemas.xmlsoap.org/soap/envelope/"
xmlns:xsd="http://www.w3.org/2001/XMLSchema"
xmlns:xsi="http://www.w3.org/2001/XMLSchema-instance">
  <soapenv:Body><getMarkup xmlns="urn:oasis:names:tc:wsrp:v1:types">
<registrationContext><registrationHandle>172.25.125.121_1136886745183_0</registrationHandle>
</registrationContext>
<portletContext><portletHandle>99.1</portletHandle></portletContext>
   <runtimeContext>
<userAuthentication>wsrp:none</userAuthentication><portletInstanceKey>
172.25.125.121_1136886739090_1</portletInstanceKey><namespacePrefix/>
   </runtimeContext>
<userContext><userContextKey>Erebus</userContextKey>
<profile><name><given>John</given><family>Doe</family><middle>Joe</middle><nickname>
Jo</nickname></name><gender>mmh</gender><employerInfo/><homeInfo/><businessInfo/>
</profile>
  </userContext>
<markupParams>
<secureClientCommunication>false</secureClientCommunication><locales>en</locales><locales>
de</locales><mimeTypes>text/html</mimeTypes>
<mode>wsrp:view</mode><windowState>wsrp:normal</windowState> <clientData>
[...........]
</getMarkup></soapenv:Body></soapenv:Envelope>
```

As seen from listing 2, individual portlets can be accessed via a SOAP request and response. The request includes consumer/user specific information, and this information can be matched against an entitlements database or a configuration file 430 to determine policy based access and dynamic content generation. For example, the portlet 600 shown in FIG. 6 is generated from the same XML feed as used by the portlet 500 displayed in FIG. 5. However, the look and feel of the remote portlet can be customized, advantageously, depending on the requesting consumer, as shown in FIGS. 5 and 6.

With the exemplary embodiments, the syntacetic interoperability offered by Web services, in conjunction with semantic interoperability offered by content sharing frameworks/domain ontologies, advantageously, offer a potent combination with potential for applications requiring reuse, flexibility, customizability, shared data/semantics, and the like. One such technology combination of the exemplary embodiments, namely the combination of WSRP and RSS, is further described.

WSRP is an extension of Web services standard for creation of interfaces for sharing of UI components and RSS is an XML data feed format consumed by aggregator applications. These two technologies are combined, so that individual aggregator applications consume remote portlets, instead of raw XML in the form of RSS.

Thus, an exemplary business case is described to highlight the requirement for dynamic generation of the UI from RSS, and an exemplary architecture is provided. In one embodiment, the coarse grained architectural components are described and prototyped in an application to showcase the viability of the exemplary embodiments. Adoption of such an approach entails provisioning of domain specific or mutually understood XML feeds and creating a WSRP compliant portlet producer. A suitable program can be employed for the generation of HTML from XML.

In further exemplary embodiments, a horizontal platform capable of achieving the exemplary architecture can be employed. This can include an intelligent Meta layer capable of dynamic generation of the UI depending on the user, portal, style sheets, policy based access, and the like. Custom tags can be added to the XML data and that carry the UI generation specific information to be interpreted by the Meta layer. The exemplary approach, advantageously, can lead to considerable savings of effort, and provides the opportunity for a new business avenue in the form of third party aggregators responsible for dynamic generation of portlets from XML feeds, which can be reused by any number of interested parties with very little intervention at the producer end.

Advantageously, the exemplary embodiments are applicable to any suitable business, for example, where a consumer base is large, products are changing fast, competition is high, online GUI content of products is an important factor, and the like. Hardware-parts providers (e.g., Chip providers to digital systems), Original Equipment Manufacturers (e.g., OEM-Dealer relations), and the like, are some of the cases where the exemplary embodiments can provide important cost benefits.

The above-described devices and subsystems of the exemplary embodiments of FIGS. 1-6 can include, for example, any suitable servers, workstations, PCs, laptop computers, PDAs, Internet appliances, handheld devices, cellular telephones, wireless devices, other devices, and the like, capable of performing the processes of the exemplary embodiments of FIGS. 1-6. The devices and subsystems of the exemplary embodiments of FIGS. 1-6 can communicate with each other using any suitable protocol and can be implemented using one or more programmed computer systems or devices.

One or more interface mechanisms can be used with the exemplary embodiments of FIGS. 1-6, including, for example, Internet access, telecommunications in any suitable form (e.g., voice, modem, and the like), wireless communications media, and the like. For example, the employed communications networks can include one or more wireless communications networks, cellular communications networks, 3G communications networks, Public Switched Telephone Network (PSTNs), Packet Data Networks (PDNs), the Internet, intranets, a combination thereof, and the like.

It is to be understood that the devices and subsystems of the exemplary embodiments of FIGS. 1-6 are for exemplary purposes, as many variations of the specific hardware and/or software used to implement the exemplary embodiments are possible, as will be appreciated by those skilled in the relevant art(s). For example, the functionality of one or more of the devices and subsystems of the exemplary embodiments of FIGS. 1-6 can be implemented via one or more programmed computer systems or devices.

To implement such variations as well as other variations, a single computer system can be programmed to perform the special purpose functions of one or more of the devices and subsystems of the exemplary embodiments of FIGS. 1-6. On the other hand, two or more programmed computer systems or devices can be substituted for any one of the devices and subsystems of the exemplary embodiments of FIGS. 1-6. Accordingly, principles and advantages of distributed processing, such as redundancy, replication, and the like, also can be implemented, as desired, to increase the robustness and performance the devices and subsystems of the exemplary embodiments of FIGS. 1-6.

The devices and subsystems of the exemplary embodiments of FIGS. 1-6 can store information relating to various processes described herein. This information can be stored in one or more memories, such as a hard disk, optical disk, magneto-optical disk, RAM, and the like, of the devices and subsystems of the exemplary embodiments of FIGS. 1-6. One or more databases of the devices and subsystems of the exemplary embodiments of FIGS. 1-6 can store the information used to implement the exemplary embodiments of the present invention. The databases can be organized using data structures (e.g., records, tables, arrays, fields, graphs, trees, lists, and the like) included in one or more memories or storage devices listed herein. The processes described with respect to the exemplary embodiments of FIGS. 1-6 can include appropriate data structures for storing data collected and/or generated by the processes of the devices and subsystems of the exemplary embodiments of FIGS. 1-6 in one or more databases thereof.

All or a portion of the devices and subsystems of the exemplary embodiments of FIGS. 1-6 can be conveniently implemented using one or more general purpose computer systems, microprocessors, digital signal processors, microcontrollers, and the like, programmed according to the teachings of the exemplary embodiments of the present invention, as will be appreciated by those skilled in the computer and software arts. Appropriate software can be readily prepared by programmers of ordinary skill based on the teachings of the exemplary embodiments, as will be appreciated by those skilled in the software art. In addition, the devices and subsystems of the exemplary embodiments of FIGS. 1-6 can be implemented by the preparation of application-specific integrated circuits or by interconnecting an appropriate network of conventional component circuits, as will be appreciated by those skilled in the electrical art(s). Thus, the exemplary embodiments are not limited to any specific combination of hardware circuitry and/or software.

Stored on any one or on a combination of computer readable media, the exemplary embodiments of the present invention can include software for controlling the devices and subsystems of the exemplary embodiments of FIGS. 1-6, for driving the devices and subsystems of the exemplary embodiments of FIGS. 1-6, for enabling the devices and subsystems of the exemplary embodiments of FIGS. 1-6 to interact with a human user, and the like. Such software can include, but is not limited to, device drivers, firmware, operating systems, development tools, applications software, and the like. Such computer readable media further can include the computer program product of an embodiment of the present invention for performing all or a portion (if processing is distributed) of the processing performed in implementing the exemplary embodiments of FIGS. 1-6. Computer code devices of the exemplary embodiments of the present invention can include any suitable interpretable or executable code mechanism, including but not limited to scripts, interpretable programs, dynamic link libraries (DLLs), Java classes and applets, complete executable programs, Common Object Request Broker Architecture (CORBA) objects, and the like. Moreover, parts of the processing of the exemplary embodiments of the present invention can be distributed for better performance, reliability, cost, and the like.

As stated above, the devices and subsystems of the exemplary embodiments of FIGS. 1-6 can include computer readable medium or memories for holding instructions programmed according to the teachings of the present invention and for holding data structures, tables, records, and/or other data described herein. Computer readable medium can include any suitable medium that participates in providing instructions to a processor for execution. Such a medium can take many forms, including but not limited to, non-volatile media, volatile media, transmission media, and the like. Non-volatile media can include, for example, optical or magnetic disks, magneto-optical disks, and the like. Volatile media can include dynamic memories, and the like. Transmission media can include coaxial cables, copper wire, fiber optics, and the like. Transmission media also can take the form of acoustic, optical, electromagnetic waves, and the like, such as those generated during radio frequency (RF) communications, infrared (IR) data communications, and the like. Common forms of computer-readable media can include, for example, a floppy disk, a flexible disk, hard disk, magnetic tape, any other suitable magnetic medium, a CD-ROM, CDRW, DVD, any other suitable optical medium, punch cards, paper tape, optical mark sheets, any other suitable physical medium with patterns of holes or other optically recognizable indicia, a RAM, a PROM, an EPROM, a FLASH-EPROM, any other suitable memory chip or cartridge, a carrier wave, or any other suitable medium from which a computer can read.

While the present invention have been described in connection with a number of exemplary embodiments and implementations, the present invention is not so limited, but rather covers various modifications and equivalent arrangements, which fall within the purview of the appended claims.

What we claim is:

1. A method for dynamic creation and customization of a user interface in a web service environment, the method comprising:

using a portlet producer having a processor and a network interface to receive a standardized data feed from a server, wherein the portlet producer dynamically generates, without user input, a customized portlet depending on user credentials and specific user requirements of a consumer stored in a configuration file, wherein the portlet producer manipulates at least a portion of the standardized data feed into a modified form to be displayed in the customized portlet in compliance with at least the specific user requirements in the configuration file;

providing policy based access to the customized portlet depending on information in the configuration file containing the user credentials and the specific user requirements of the consumer; and providing caching or cache refreshing of at least a portion of the standardized data feed from the server.

2. The method of claim 1, wherein the consumer includes a portal or an individual accessing the portlet.

3. The method of claim 1, wherein the feed includes a XML feed.

4. The method of claim 1, wherein the feed includes a RSS feed.

5. The method of claim 1, further comprising: using the portlet producer, providing a customized user interface for the consumer of the portlet.

6. The method of claim 5, further comprising providing a meta layer for generation of markup from the feed for providing the customized user interface.

7. The method of claim 1, further comprising employing a WSRP standard to allow the consumer to consume the portlet based on a Web services interface.

8. A computer apparatus for dynamic creation and customization of a user interface in a web service environment, the apparatus comprising:
 a portlet producer having a network interface to receive a standardized data feed from a server, the portlet producer configured to dynamically generate without user input a user defined customized portlet in compliance with user credentials and specified user requirements of a consumer stored in a configuration file, wherein the portlet producer manipulates at least a portion of the standardized data feed into a modified form in the customized portlet based on the configuration file;
 a mechanism for policy based access to the customized portlet depending on information in the configuration file containing the user credentials and the specific user requirements of the consumer; and
 a mechanism for caching or cache refreshing at least a portion of the received standardized data feed from the server.

9. The apparatus of claim 8, wherein the consumer includes a portal or an individual accessing the portlet.

10. The apparatus of claim 8, wherein the feed includes a XML feed.

11. The apparatus of claim 8, wherein the feed includes a RSS feed.

12. The apparatus of claim 8, wherein the portlet producer is further configured to provide a customized user interface for the consumer of the portlet.

13. The apparatus of claim 12, further comprising a meta layer for generation of markup from the feed for providing the customized user interface.

14. The apparatus of claim 8, wherein a WSRP standard is employed to allow the consumer to consume the portlet based on a Web services interface.

15. A computer storage device tangibly embodying a plurality of instructions on a computer readable medium for dynamic creation and customization of a user interface in a web service environment, wherein the instructions are executed by a machine to perform a method comprising the steps of:
 dynamically generating without user input a customized portlet depending on at least user credentials and specific user requirements of a consumer stored in a configuration file;
 receiving a standardized data feed from a server;
 manipulating at least a portion of the standardized data feed into a modified form in compliance with the customized portlet based on the configuration file, wherein the modified data feed is to be displayed in the customized portlet on a client device;
 providing policy based access to the customized portlet depending on information in the configuration file containing the at least the user credentials and the specific user requirements of the consumer; and
 providing caching or cache refreshing of at least a portion of the standardized data feed from the server.

16. The computer storage device of claim 15, wherein the consumer includes a portal or an individual accessing the portlet.

17. The computer storage device of claim 15, wherein the feed includes a XML feed.

18. The computer storage device of claim 15, wherein the feed includes a RSS feed.

19. The computer storage device of claim 15, further comprising providing a customized user interface for the consumer of the portlet.

20. The computer storage device of claim 19, further comprising providing a meta layer for generation of markup from the feed for providing the customized user interface.

21. The computer storage device of claim 15, further comprising employing a WSRP standard to allow the consumer to consume the portlet based on a Web services interface.

22. The method of claim 1, where said configuration file includes the web services the user would like to use.

23. The method of claim 22, where said configuration file may be set to automatically search for new and similar web services related to those that the user would like to use.

24. The apparatus of claim 8, where said configuration file includes the web services the user would like to use.

25. The apparatus of claim 24, where said configuration file may be set to automatically search for new and similar web services related to those that the user would like to use.

26. The computer storage device of claim 15, where said configuration file includes the web services the user would like to use.

27. The computer storage device of claim 26, where said configuration file may be set to automatically search for new and similar web services related to those that the user would like to use.

* * * * *